(12) United States Patent
Lo (10) Patent No.: US 11,544,521 B2
(45) Date of Patent: Jan. 3, 2023

(54) NEURAL NETWORK LAYER PROCESSING WITH SCALED QUANTIZATION

(71) Applicant: Microsoft Technology Licensing, LLC, Redmond, WA (US)

(72) Inventor: Daniel Lo, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 984 days.

(21) Appl. No.: 16/284,407

(22) Filed: Feb. 25, 2019

(65) Prior Publication Data

US 2020/0272881 A1 Aug. 27, 2020

(51) Int. Cl.
G06N 3/04 (2006.01)
G06F 7/483 (2006.01)
G06F 17/16 (2006.01)

(52) U.S. Cl.
CPC ............ *G06N 3/04* (2013.01); *G06F 7/483* (2013.01); *G06F 17/16* (2013.01)

(58) Field of Classification Search
CPC ...... G06N 3/04; G06N 3/0445; G06N 3/0454; G06N 3/063; G06F 7/483; G06F 17/16
See application file for complete search history.

(56) References Cited

PUBLICATIONS

R. Ding, Z. Liu, R. D. S. Blanton and D. Marculescu, "Quantized deep neural networks for energy efficient hardware-based inference," 2018 23rd Asia and South Pacific Design Automation Conference (ASP-DAC), 2018, pp. 1-8, doi: 10.1109/ASPDAC.2018.8297274. (Year: 2018).*
Jacob, et al., "Quantization and Training of Neural Networks for Efficient Integer-Arithmetic-Only Inference", In Repository of arXiv:1712.05877, Dec. 15, 2017, 14 Pages.
Krishnamoorthi, Raghuraman, "Quantizing Deep Convolutional Networks for Efficient Inference: A Whitepaper", In Repository of arXiv:1806.08342, Jun. 21, 2018, 36 Pages.
"International Search Report and Written Opinion Issued in PCT Application No. PCT/US20/017799", dated Jun. 15, 2020, 13 Pages.

* cited by examiner

*Primary Examiner* — Matthew Mikels
(74) *Attorney, Agent, or Firm* — Ranjeev Singh; Singh Law, PLLC (57) ABSTRACT

Processors and methods for neural network processing are provided. A method includes receiving a subset of data corresponding to a layer of a neural network. The method further includes prior to performing any matrix operations using the subset of the data, scaling the subset of the data by a scaling factor to generate a scaled subset of data. The method further includes quantizing the scaled subset of the data to generate a scaled and quantized subset of data. The method further includes performing the matrix operations using the scaled and quantized subset of the data to generate a subset of results of the matrix operations. The method further includes descaling the subset of the results of the matrix operations, by multiplying the subset of the results of the matrix operations with an inverse of the scaling factor, to generate a descaled subset of results of the matrix operations.

20 Claims, 5 Drawing Sheets

NEURAL NETWORK LAYER PROCESSING WITH SCALED QUANTIZATION

BACKGROUND

Neural network technology is used to perform complex tasks such as image classification, reading comprehension, language translation, or speech recognition. Many of these tasks include deep learning that involves performing large numbers of floating point matrix multiply and accumulate operations. These operations are performed during training as well as during serving of results based on the input data and the trained data.

Neural networks may use values corresponding to the input data and the training data expressed in different formats, including data expressed in different levels of precision.

SUMMARY

In one example, the present disclosure relates to a method including receiving a subset of data corresponding to a layer of a neural network. The method may further include prior to performing any matrix operations using the subset of the data, using a processor, scaling the subset of the data by a scaling factor to generate a scaled subset of data. The method may further include using the processor, quantizing the scaled subset of the data to generate a scaled and quantized subset of data. The method may further include performing the matrix operations using the scaled and quantized subset of the data to generate a subset of results of the matrix operations. The method may further include descaling the subset of the results of the matrix operations, by multiplying the subset of the results of the matrix operations with an inverse of the scaling factor, to generate a descaled subset of results of the matrix operations.

In another example, the present disclosure relates to a processor configured to receive a subset of data corresponding to a layer of a neural network. The processor may further be configured to prior to performing any matrix operations using the subset of the data, scale the subset of the data by a scaling factor to generate a scaled subset of data. The processor may further be configured to quantize the scaled subset of the data to generate a scaled and quantized subset of data. The processor may further be configured to perform the matrix operations using the scaled and quantized subset of the data and generate a subset of results of the matrix operations. The processor may further be configured to descale the subset of the results of the matrix operations, by multiplying the subset of the results of the matrix operations with an inverse of the scaling factor, to generate a descaled subset of results of the matrix operations.

In yet another example, the present disclosure relates to a method including receiving a subset of data corresponding to a layer of a neural network. The method may further include prior to performing any matrix operations using the subset of the data, using a processor, scaling the subset of the data by a scaling factor to generate a scaled subset of data. The method may further include using the processor, quantizing the scaled subset of the data to generate a scaled and quantized subset of data. The method may further include using the processor, quantizing the subset of the data to generate a quantized subset of data. The method may further include determining a first quantization error associated with the scaled and quantized subset of data and determining a second quantization error associated with the quantized subset of data. The method may further include if the first quantization error is greater than or equal to the second quantization error, then performing the matrix operations using the quantized subset of data to generate a first subset of results of the matrix operations. The method may further include if the first quantization error is lower than the second quantization error, then performing the matrix operations using the scaled and quantized subset of the data to generate a second subset of results of the matrix operations and descaling the second subset of the results of the matrix operations, by multiplying the second subset of the results of the matrix operations with an inverse of the scaling factor, to generate a descaled subset of results of the matrix operations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples disclosed in the present disclosure relate to systems, methods, and components for implementing neural network based processing. Certain examples relate to processing layers of Convolutional Neural Networks (CNNs) using scaled quantization. Certain examples relate to processing layers of CNNs using a neural network processor. A neural network processor may be implemented using any of Field Programmable Gate Arrays (FPGAs), Application Specific Integrated Circuits (ASICs), Erasable and/or Complex programmable logic devices (PLDs), Programmable Array Logic (PAL) devices, and Generic Array Logic (GAL) devices. Neural network processors may also be implemented using a CPU, a GPU, a combination of CPUs and GPUs, or a combination of any of the programmable hardware, CPUs, and GPUs. An image file may be used to configure or re-configure FPGAs. The image file or similar file or program may be delivered via a network link or a local link (e.g., PCIe) from a host CPU. Information included in an image file can be used to program hardware blocks of a node (e.g., logic blocks and reconfigurable interconnects of an FPGA) to implement desired functionality. Desired functionality can be implemented to support any service that can be offered via a combination of computing, networking, and storage resources, such as via a data center or other infrastructure for delivering a service.

The described aspects can also be implemented in cloud computing environments. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model may be used to expose various service models, such as, for example, Hardware as a Service ("HaaS"), Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

Machine learning services, such as those based on Recurrent Neural Networks (RNNs), Long Short Term Memory (LSTM) neural networks, or Gated Recurrent Units (GRUs) may be implemented using the systems and nodes described in this disclosure. In one example, the service-related content or other information such as words, sentences, images, videos, or other such content/information may be translated into a vector representation.

In one example, the neural network model may comprise of many layers and each layer may be encoded as matrices or vectors of weights expressed in the form of coefficients or constants that have been obtained via training of a neural network. GPUs or programmable hardware logic blocks in the nodes may process the matrices or vectors to perform various operations, including multiply, add, and other operations against input vectors representing encoded information related to the service.

Taking the LSTM example, an LSTM network may comprise a sequence of repeating RNN layers or other types of layers. Each layer of the LSTM network may consume an input at a given time step, e.g., a layer's state from a previous time step, and may produce a new set of outputs or states. In case of using the LSTM, a single chunk of content may be encoded into a single vector or multiple vectors. As an example, a word or a combination of words (e.g., a phrase, a sentence, or a paragraph) may be encoded as a single vector. Each chunk may be encoded into an individual layer (e.g., a particular time step) of an LSTM network. An LSTM layer may be described using a set of equations, such as the ones below:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} i_t \tan h(W_{xc}x_t + W_{hc}h_{t-1} + b_c)$$

$$o_t = \sigma(W_{xo}x_t + W_{ho}h_{t-1} + W_{co}c_t + b_o)$$

$$h_t = o_t \tan h(c_t)$$

In this example, inside each LSTM layer the inputs and hidden states may be processed using a combination of vector operations (e.g., dot-product, inner product, or vector addition) and non-linear functions (e.g., sigmoids, hyperbolic and tangents). In certain cases, the most compute intensive operations may arise from the dot products, which may be implemented using dense matrix-vector and matrix-matrix multiplication routines. In one example, the processing of the vector operations and non-linear functions may be performed in parallel.

Values corresponding to the training data, including vector data, may be represented in a number format. Floating point representation for the values of the vector data is expensive because each individual point value has an exponent specific to that point value. The alternative may be a fixed point representation. Performance, energy usage, and storage requirements can be improved through the use of reduced precision formats to implement artificial neural networks. Such formats can represent floating point numbers using a small (e.g. 3, 4, or 5-bit) mantissa and an exponent shared by two or more floating point numbers. Neural networks that use reduced precision formats may be referred to as quantized neural networks.

In one example, fixed point representation may use a set number of integer bits and fractional bits to express numbers. Fixed point can be efficiently processed in hardware with integer arithmetic, which may make it a preferred format when applicable. Fixed point format may be represented as qX.Y, where X is the number of integer bits and Y is the number of fractional bits. Block-floating point (BFP) may apply a shared exponent to a block of fixed point numbers; for example, a vector or matrix. The shared exponent may allow a significantly higher dynamic range for the block, although individual block members have a fixed range with respect to each other.

Quantized neural networks can improve the latency and throughput of running neural networks by reducing computation and memory demands. The use of reduced precision formats (e.g., any of a reduced precision floating point format, the Block Floating Point (BFP), or integers), however, can create issues when training neural networks. Parameters that may be suitable at the beginning of training may become suboptimal as the neural network converges. In addition, many neural network approaches typically use full precision floating point (e.g., 32- or 16-bit floating point numbers). As an example, certain software implementations of neural networks may use full precision floating point numbers. On the other hand, certain hardware implementations of neural networks may use reduce precision numbers. Because underlying implementations of software and hardware-accelerated neural networks are different, small differences in calculations can arise that can cause errors over time.

The core of many neural network algorithms is a matrix multiplication operation: y=xW, where x are input activations and W is a weight matrix. In one example, quantization is applied to the input activations and the weight matrix to reduce the hardware costs of computing the matrix multiplication. Thus, the matrix multiplication operation may be y=Q(x)Q(W). With the unquantized matrix multiplication $$y = \alpha \left( x \frac{W}{a} \right),$$

the arbitrary scalar values may be factored out without affecting the result. However, if quantization is applied to this form, then the result of the quantized matrix multiplication $$y = \alpha Q(x) Q\left(\frac{W}{\alpha}\right)$$

is affected in two ways. First, the weight values that are quantized are different, and thus they may lead to a different set of quantized points. Second, the high-precision scalar multiply after the matrix multiplication may also change the results. Certain examples in this disclosure relate to scaling weight values and other parameter values associated with a neural network prior to quantization. For example, the number 1.0011101101 2^6 may be scaled to the value 1.111 2^6 prior to quantization. The scaled value may be quantized, and operations may be performed in the quantized domain (e.g., training, inference). In some examples, a value may be portioned into tiles. A scaling operation can be performed for each tile.

Figure 1:
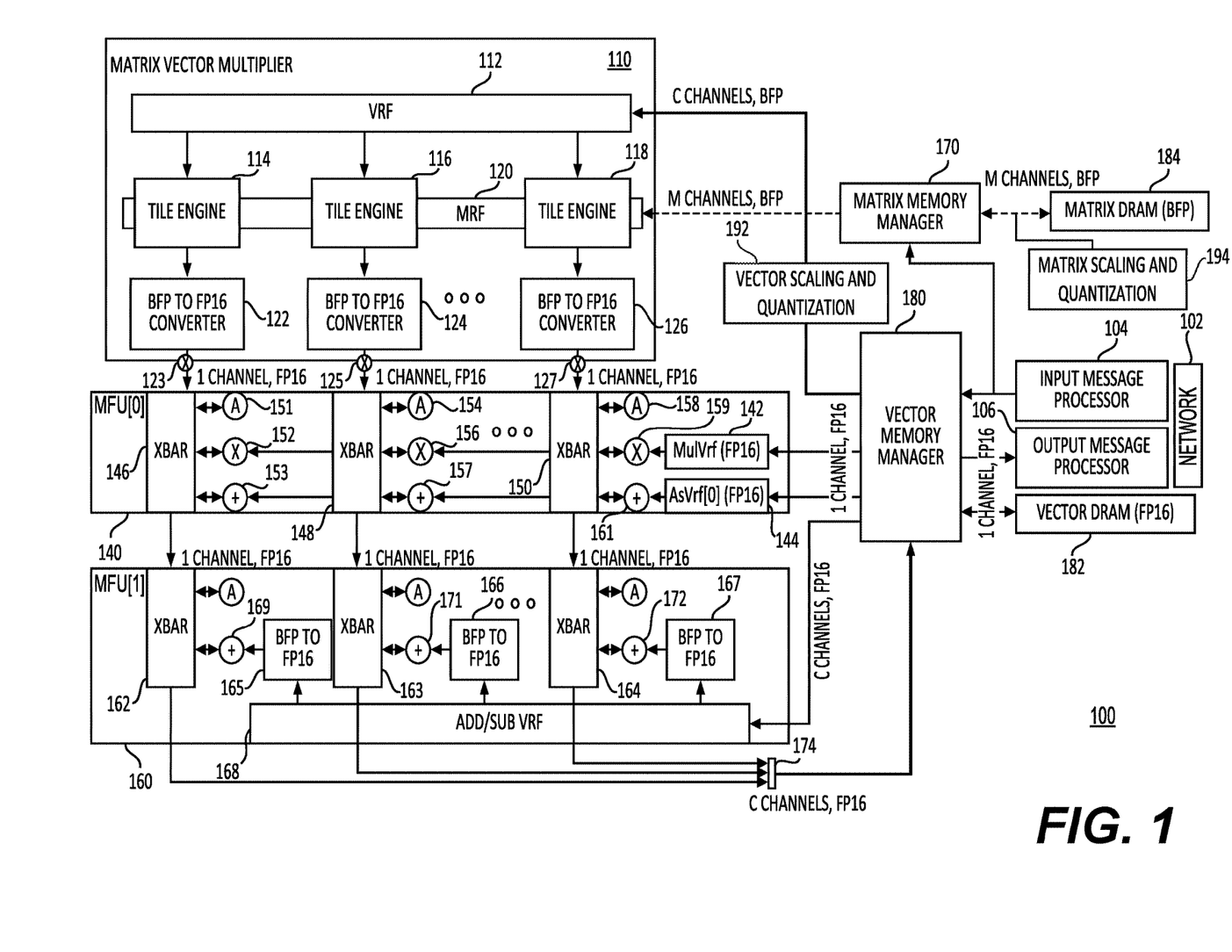
FIG. 1 is a block diagram of a neural network processor with scaled quantization in accordance with one example.

FIG. 1 is a block diagram of a neural network processor 100 in accordance with one example. Each neural network processor 100 may include an Input Message Processor (IMP) 104 for receiving messages from other processors and an Output Message Processor (OMP) 106 for processing outgoing messages to other processors or components. Such messages may be received and transmitted via network 102. Each neural network processor 100 may further include a matrix vector multiplier (MVM) 110 and two or more multifunction units (MFUs) (e.g., MFU[0] 140 and MFU[1] 160). Each neural network processor 100 may further include a matrix memory manager 170, a vector memory manager 180, a Vector DRAM 182, and a Matrix DRAM 184. In this example, the processor may accept off-chip messages containing auxiliary information such as control and scalar data and payload data (e.g., vectors, matrices, or other tensor data structures). In this example, the incoming messages may be handled by a lightweight input message processor (IMP) 104, which sends the vectors to vector memory manager 180. IMP 104 may send the matrices to matrix memory manager 170.

Each of vector data (e.g., data corresponding to activations) and matrix data (e.g., data corresponding to weights) may be scaled and quantized using vector scaling and quantization 192 and matrix scaling and quantization 194, respectively. Thus, vector data received from vector memory manager 180 may be in a higher precision format (e.g., FP16 or FP32) and vector scaling and quantization 192 may scale the higher precision vector data and then convert the scaled vector data from the higher precision format to a lower precision format (e.g., block floating point format). Similarly, matrix data received via network 102 or otherwise may be in a higher precision format (e.g., FP16 or FP32) and matrix scaling and quantization 194 may scaled the higher precision matrix data and then convert the scaled matrix data from the higher precision format to a lower precision format (e.g., block floating point format). Because the matrix multiplication operations are more expensive in terms of resources and time, in one example, it may be advantageous to scale and quantize only the inputs to MVM 110. Thus, in the example shown in FIG. 1, only the inputs to MVM 110 are being scaled and quantized. The inputs to the MFUs are not being scaled and quantized. Alternatively, in another example, inputs to both MVM 110 and the MFUs may be scaled and quantized.

Figure 2:
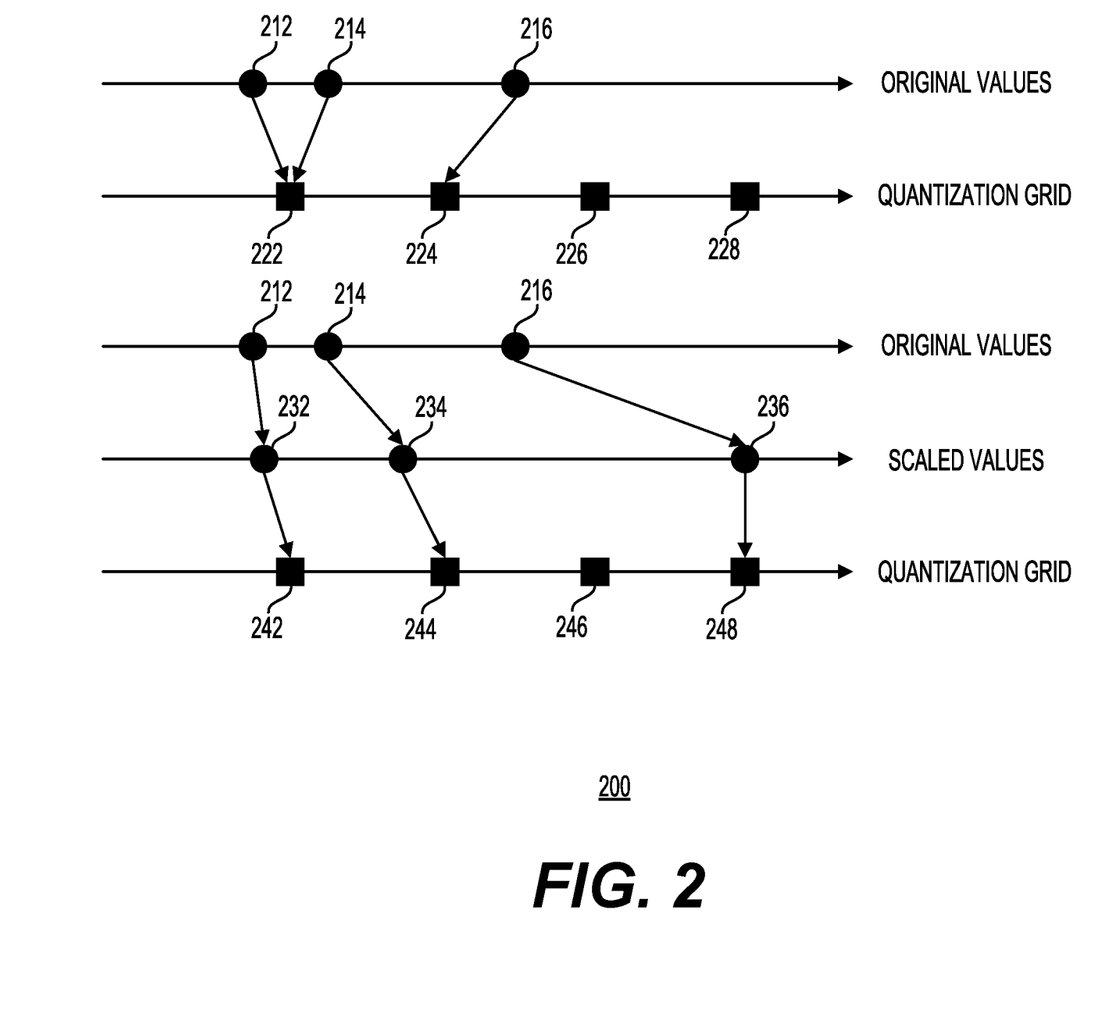
FIG. 2 is diagram showing scaling and quantization.

Quantization may involve mapping continuous or high-precision values onto a discrete, low-precision grid. If the original points are close to their mapped quantization value, then one expects that the resulting computations will be close to the original computations. In the present disclosure, the original values are quantized to better match a quantization grid. Thus, as shown in FIG. 2, in one example, scaled quantization manager is configured to scale the values such that the largest value matches up with the largest quantization grid point. As shown in FIG. 2, as an example, when no scaling is applied, the top two quantization points (226 and 228) along the quantization grid are unused, causing the three input values (212, 214, and 216) to be put into two bins (222 and 224). Additional bins (226 and 228) along the quantization grid are left unused. When quantization is applied, advantageously now the full quantization grid range is used; that in turn allows one to distinguish between the lowest two values after quantization. Thus, as shown in FIG. 2, with scaling, original value 212 is scaled to scaled value 232; original value 214 is scaled to scaled value 234, and original value 216 is scaled to scaled value 236. The scaled values are then quantized resulting in quantized values 242, 244, and 248 along the quantization grid. Only one quantization bin (246) is left unused this time.

In one example, the weight values represented in the matrix may be scaled such that the highest value matches up with the highest quantization point. For a quantized mantissa of b bits, the max mantissa value is $2^b-1$. In this example, the weight matrix W may be scaled using the equations below such that the largest absolute value becomes $2^b-1$.

$$m = \max(\mathrm{abs}(W))$$
$$\alpha = \frac{m}{2^b - 1}$$
$$W' = \frac{W}{\alpha}$$

For one example, Table 1 below shows results comparing validation accuracy on the ImageNet dataset for ResNet-50. As shown, with scaling and quantization, the top-1 accuracy is improved from 53.13% to 59.21% and the top-5 accuracy is improved from 76.49% to 81.36%.

TABLE 1

| Configuration | Top-1 Accuracy | Top-5 Accuracy |
| --- | --- | --- |
| Floating-point 32 | 74.95% | 92.06% |
| Quantized | 53.13% | 76.49% |
| Scaled and quantized | 59.21% | 81.36% |

With continued reference to FIG. 1, each of the matrices may have an N by N size and each of the vectors may have a size of 1 by N. In this example, all instructions corresponding to neural network processor 100 may operate on native-sized data. Logical vectors and matrices corresponding to the applications handled by neural network processor 100 may often be larger than the native size; in these cases, the vectors and matrices may be broken up into native-sized tiles. In one example, the block size of the BFP format data may be equal to the native dimension. Therefore, each native 1 by N vector may have a shared exponent, and each row of an N by N matrix may have a shared exponent. Each of the vector data and the matrix data may have a two's complement mantissa portion, and the mantissa size for the vector data and the matrix data may be different. In one example, there may not be a need for the shared exponent. Instead, the weight values may be fixed to be within an integer range, e.g., $-2^b-1$ to $2^b-1$. This may further simplify the hardware used for performing the dot product operations.

Still referring to FIG. 1, MVM 110 may include a vector register file (VRF) 112, a matrix register file (MRF) 120, and tile engines (e.g., tile engines 114, 116, and 118). Tile engines may receive input matrix and input vector data from VRF 112. MVM 110 may further include precision format converters. In this example, a scaling operation can be performed for each tile. Thus, matrix scaling and quantization 194 may scale and quantize weight values for each of tile engines 114, 116, and 118 in parallel. Similarly, vector scaling and quantization 192 may scale and quantize activation values for each of tile engines 114, 116, and 118 in parallel. In one example, two internal BFP formats may be used by MVM 110 for expressing its input and output: BFP short, for vector and matrix storage, and BFP long for accumulation. In one example of MVM 110, BFP short may use q1.15 fixed point values with a shared 5 bit exponent, and BFP long may use q34.40 fixed point values with a shared 5 bit exponent. In this example, the matrix-vector multiplication may result in BFP long, which may be converted back to a floating-point format as a final output stage. Thus, the example MVM 110 shown in FIG. 1 may include BFP to FP16 Converters 122, 124, and 126 at the output stages. Tile engines 114, 116, and 118 may, in parallel, provide outputs to the respective converters as shown in the example in FIG. 5. The outputs from the respective converters representing the results of the matrix operations performed by MVM 110 may be output to de-scalers 123, 125, and 127, respectively. In this example, each of de-scalers 123, 125, and 127 may be configured to multiply the respective result of the matrix operations with an inverse of the scaling factor used as part of scaling and quantization. The descaled results may then be further processed, including for example by MFU[0] 140.

The matrix data may be communicated between Matrix DRAM 184 and Matrix Memory manager 170 using M number of channels. Vector memory manager 180 may move vector data over C number of channels.

With continued reference to FIG. 1, each MFU (e.g., MFU[0] 140 and MFU[1] 160) may include crossbars (e.g., crossbars labeled as xbars). MFU[0] 140 may support vector operations, such as vector-vector multiply and addition, a Sigmoid function, a Tan H function, a softmax operation, a Rectified Linear Unit (ReLU) operation, and/or an activation block operation. Thus, as shown in FIG. 1, MFU[0] 140 may include crossbars (e.g., xbar 146, 148, and 150) that may stream a vector from its input bus through a pipelined sequence of operations. Thus, a vector may be received via a register file labeled MulVrf 142 or another register file labeled AsVrf[0] 144, and such vectors may be subjected to any of a multiply operation, an addition operation, or some other operation. MFU[0] 140 may include several hardware blocks for performing addition (e.g., 153, 157, and 161). MFU[0] 140 may also include several hardware blocks for performing multiplication (e.g., 152, 156, and 159). MFU[0] 140 may also include several hardware blocks for performing activation (e.g., 151, 154, and 158).

Still referring to FIG. 1, MFU[1] 160 may include crossbars (e.g., xbar 162, 163, and 164) that may allow MFU[1] 160 to receive outputs from MFU[0] 140 and perform additional operations on those outputs and any additional inputs received via ADD/SUB VRF 168. MFU[1] 160 may include several hardware blocks for performing addition (e.g., 169, 171, and 172). MFU[1] 160 may also include several hardware blocks for performing activation. The outputs from MFU[1] 160 received via C channels may be coupled via a multiplexing circuit 174 to vector memory manager 180. Although FIG. 1 shows a certain number of components of neural network processor 100 arranged in a certain manner, there could be more or fewer number of components arranged differently.

Neural network processor 100 may be used to enable issuance of instructions that can trigger millions of operations using a small number of instructions. As an example, Table 2 below shows instructions corresponding to a fully parameterized LSTM:

TABLE 2

```
void LSTM (int steps) {
    for (int t = 0; t < steps; t++) {
        v_rd (s , NeqQ, DONTCARE) ;
        v_wr (s , InitialVrf, 1stm → ivrf_xt) ;
        // xWF = xt * Wf + bf
        v_rd (s, InitialVrf , 1stm → ivrf_xt);
        mv_mul (s , 1stm → mrf_Wf) ;
        vv_add (s , 1stm → asvrf_bf) ;
        v_wr (s , AddSubVrf , 1stm → asvrf_xWf) ;
        // xWi = xt * Wi + bi ...
        // xWf = xt * Wo + bo ...
        // xWc = xt * Wc + bc ...
        // f gate → multiply by c_prev
        v_rd (s , InitialVrf , 1stm → ivrf_h_prev) ;
        mv_mul (s , 1stm → mrf_Uf) ;
        vv_add (s , 1stm → asvrf_xWf) ;
        v_sigm (s) ; // ft
        vv_mul (s , 1stm → mulvrf_c_prev);
        v_wr (s , AddSubVrf , 1stm → asvrf_ft_mod) ;
        // i gate ...
        // o gate ...
        // c gate → store ct and c_prev
        v_rd (s , InitialVrf , 1stm → ivrf_h_prev) ;
        mv_mul (s , 1stm → mrf_Uc) ;
        vv_add (s , 1stm → asvrf_xWc) ;
        v_tanh (s) ;
        vv_mul (s , 1stm → mulvrf_it) ;
        vv_add (s , 1stm → asvrf_ft_mod) ; // ct
        v_wr (s , MultiplyVrf , 1stm → mulvrf_c_prev);
        v_wr (s , InitialVrf , 1stm → ivrf_ct) ;
        // produce ht, store and send to network
        v_rd (s , InitialVrf , 1stm → ivrf_ct) ;
        v_tanh (s) ;
        vv_mul (s , 1stm → mulvrf_ot) ; // ht
        v_wr (s , InitialVrf, 1stm → ivrf_h_prev) ;
        v_wr (s , NetQ , DONTCARE) ;
    }
}
```

Although Table 2 shows a certain number of instructions having a certain format, neural network processor 100 may execute more or fewer instructions having a different format to accomplish the same objectives.

Table 3 below shows how to compute a 1×1 convolution as part of a CNN evaluation.

TABLE 3

```
SetIterations(bs, args->iterations);
SetRowsCols(bs, 1, args->cols);
// Compute
v_rd_inc(bs, ISA_Mem_MvmInitialVrf, mvuivrf_input, args->cols);
mv_mul(bs, mrf_weights);
vv_add_inc(bs, ISA_Mem_AddSubVrf_0, asvrf0_bias, 0);
vv_add_inc(bs, ISA_Mem_AddSubVrf_1, asvrf1_residual, 1);
v_relu(bs);
v_wr_inc(bs, ISA_Mem_NetOutputQ, DONTCARE, DONTCARE).
```

As shown in the table above, the number of iterations over a chain of instructions for the computation may be specified. Next, as needed, the native dimension of each instruction chain may be scaled by a column scaling factor. And after reading the vector data from the vector register file it may be multiplied with the weights retrieved from the matrix register file. After performing additional operations as required by the CNN evaluation, the output may be provided. As an example, a pointwise Rectified Linear Unit (ReLU) operation may be performed for each element of the vector data.

Table 4 below shows how to compute an N×N convolution as part of a CNN evaluation. The instructions below that are similar to the 1×1 convolution are not described again. The Set2dWindows instruction may be used to set the total window size and then SetIterations instruction may be used to slide that window across the input volume. The *_inc instructions (e.g., v_rd_inc and v_add_inc) may be used to increment the instruction's address based on the stride. As an example, a stride of 2 may result in skipping of every other vector in the vector register file that is used to store vector data for operations, such as addition.

TABLE 4

```
SetRowsCols(bs, 1, args->windowCols * args->windowCols * args-
>volumeDepth);
Set2dWindow(bs, args->windowCols * args->volumeDepth, input_cols);
SetIterations(bs, output_cols);
for (unsigned imageRow = 0; imageRow < output_rows; imageRow++)
{
    for (unsigned filter = 0; filter < args->filterCount; filter++)
    {
        v_rd_inc(bs, ISA_Mem_MvmInitialVrf, ivrf_input + imageRow*
args->windowStride * input_cols, args->volumeDepth * args-
>windowStride);
        mv_mul(bs, mrf_weights + filter * args->windowCols * args-
>windowCols * args->volumeDepth);
        vv_add_inc(bs, ISA_Mem_AddSubVrf_0, asvrf0_bias + filter, 0);
        v_relu(bs);
        v_wr_inc(bs, ISA_Mem_Dram, dram_buffer_wr_ptr + filter,
output_depth);
    }
    dram_buffer_wr_ptr += output_cols * output_depth;
}
```

Figure 3:
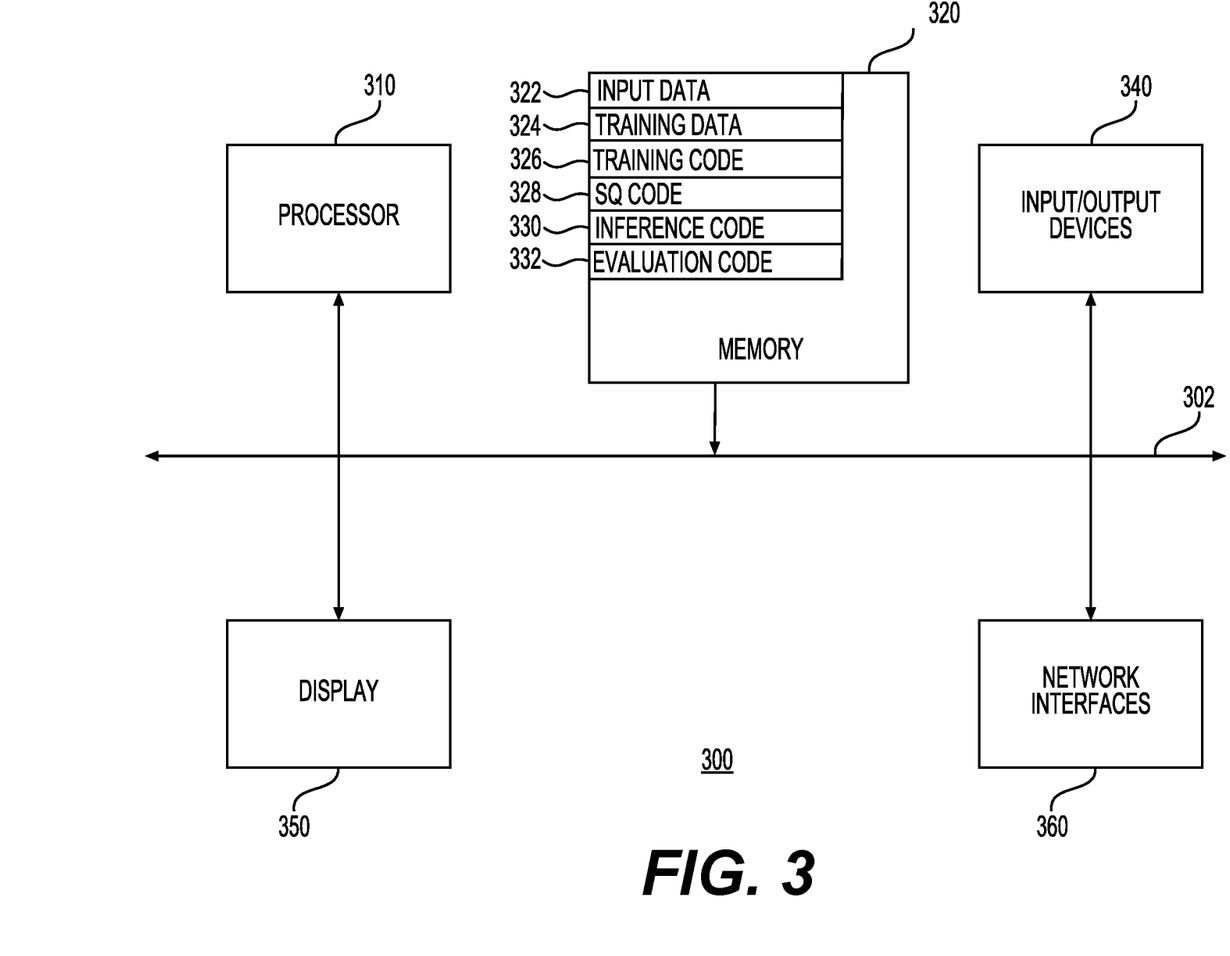
FIG. 3 is a block diagram of a system for scaled quantization in accordance with one example.

FIG. 3 is a block diagram of a system for scaled quantization in accordance with one example. System 300 may include a processor 310, a memory 320, input/output devices 340, display 350, and network interfaces 360 interconnected via bus system 302. Memory 320 may include input data 322, training data 324, training code 326, scaling and quantization (SQ) code 328, inference code 330, and evaluation code 332. Input data 322 may comprise data corresponding to images or other types of information that can be classified or otherwise processed using a neural network. Memory 320 may further include training data 324 that may include weights obtained by training the neural network using the higher precision numbers (e.g., floating point format numbers). Memory 320 may further include training code 326 comprising instructions configured to train a neural network, such as ResNet-50. Training code 326 may use the weights obtained by training the neural network using the higher precision numbers (e.g., floating point format numbers).

Scaling and quantization (SQ) code 328 may include instructions configured to scale and quantize input data 322 or training data 324. As described earlier, in one example, scaling may include multiplying the data that is in a higher precision format (e.g., FP32 or FP16) by a scaling factor. Quantizing may include converting the scaled values of the data from the higher precision format to a lower precision format (e.g., a lower precision floating point format, an integer, or a block floating point format).

With continued reference to FIG. 3, memory 320 may further include inference code 330 comprising instructions to perform inference using a trained neural network. Memory 320 may further include evaluation code 332 comprising instructions to evaluate the performance of the trained neural network in terms of the accuracy of inference. Although FIG. 3 shows a certain number of components of system 300 arranged in a certain way, additional or fewer components arranged differently may also be used. In addition, although memory 320 shows certain blocks of code, the functionality provided by this code may be combined or distributed. In addition, the various blocks of code may be stored in non-transitory computer-readable media, such as non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media.

Figure 4:
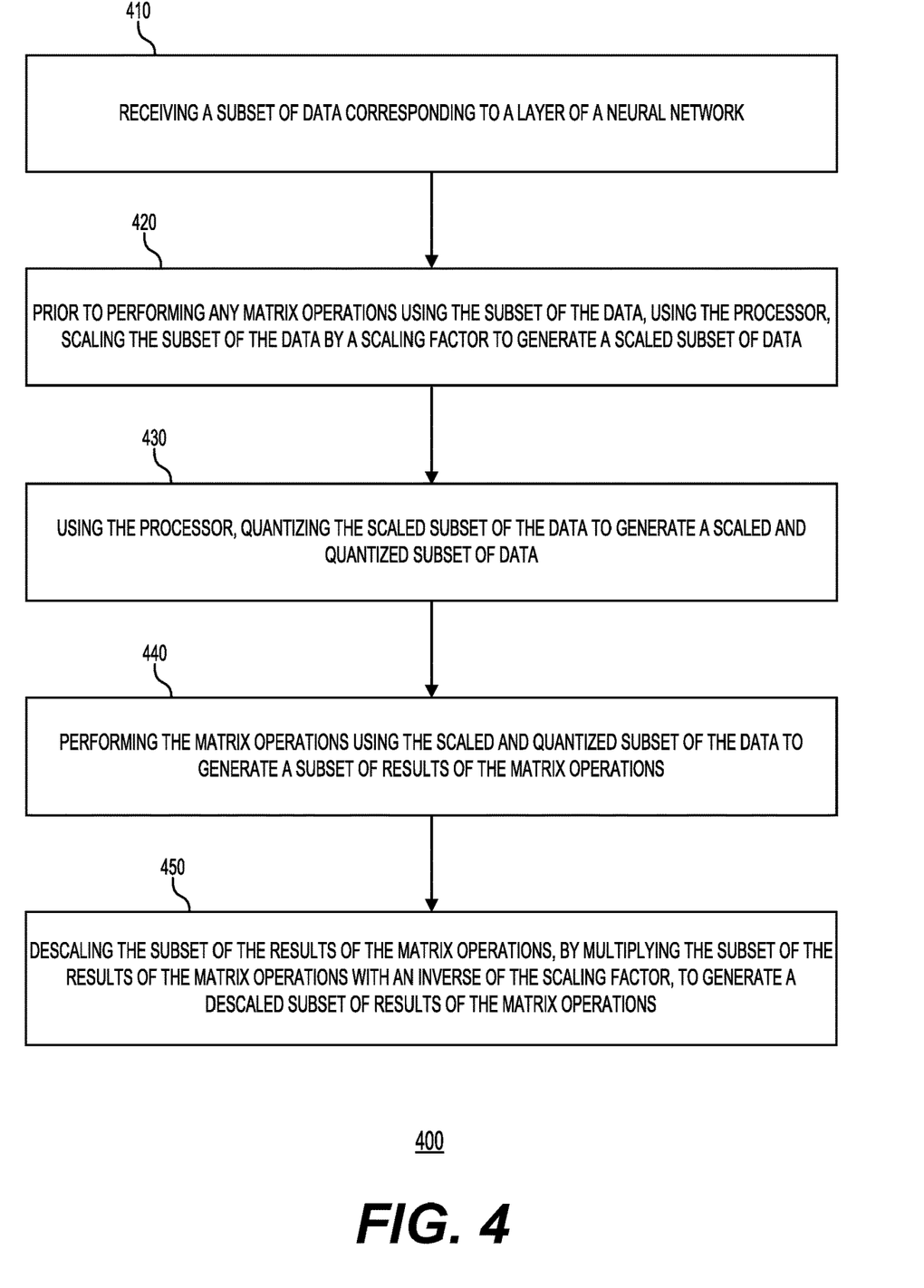
FIG. 4 shows a flow diagram of a method for performing scaled quantization in accordance with one example.

FIG. 4 is a flow chart 400 of a method in accordance with one example. The method may be implemented by processor 310 of FIG. 3. Alternatively, all or some of the steps of this method may be implemented by neural network processor 100. Step 410 may include receiving a subset of data corresponding to a layer of a neural network. In one example, the subset of the data is expressed in a higher precision format (e.g., FP32 of FP16). In one example, the higher precision format may be floating point precision format. Prior to this step, another step may include memory 320 receiving input data 322 via another storage or via a network and storing as part of input data 322.

Step 420 may include, prior to prior to performing any matrix operations using the subset of the data, using the processor, scaling the subset of the data by a scaling factor to generate a scaled subset of the data. This step may be performed using SQ code 328. Alternatively, this step may be performed by vector scaling and quantization 192 and/or by matrix scaling and quantization 194.

Step 430 may include, using the processor, quantizing the scaled subset of the data to generate a scaled and quantized subset of data. This step may be performed using SQ code 328. Alternatively, this step may be performed by vector scaling and quantization 192 and/or by matrix scaling and quantization 194. In one example, this step may include converting the scaled subset of the data from a higher precision format to a lower precision format.

Step 440 may include performing the matrix operations using the scaled and quantized subset of the data to generate a subset of results of the matrix operations. This step may be performed using training code 326 or inference code 330 when executed by processor 310 of FIG. 3. Alternatively, this step may be performed by MVM 110 of FIG. 1 as explained earlier.

Step 450 may include descaling the subset of the results of the matrix operations, by multiplying the subset of the results of the matrix operations with an inverse of the scaling factor, to generate a descaled subset of results of the matrix operations. This step may be performed using SQ code 328 when executed by processor 310 of FIG. 3. Alternatively, this step may be performed by de-scalers 123, 125, and 127 of FIG. 1. In this example, each of de-scalers 123, 125, and 127 may be configured to multiply the respective result of the matrix operations with an inverse of the scaling factor used as part of the scaling operation. Although FIG. 4 describes several steps performed in a certain order, additional or fewer steps may be performed in a different order. In addition, each of the steps of flowchart 400 may be performed by neural network processor 100, or by processor 310, or by a combination of the two.

In one example, instead of searching for an optimum scaling factor, scaling may be applied selectively. For each block of data that may be subjected to scaling, the quantization error with and without applying a scaling factor is calculated and the case that has less error may be used. Different type of error metrics (e.g., L1 error, L2 error, max error, relative error, etc.) may be used to compare the quantization error. While this calculation requires quantizing the weights twice, the process can be done entirely offline.

Figure 5:
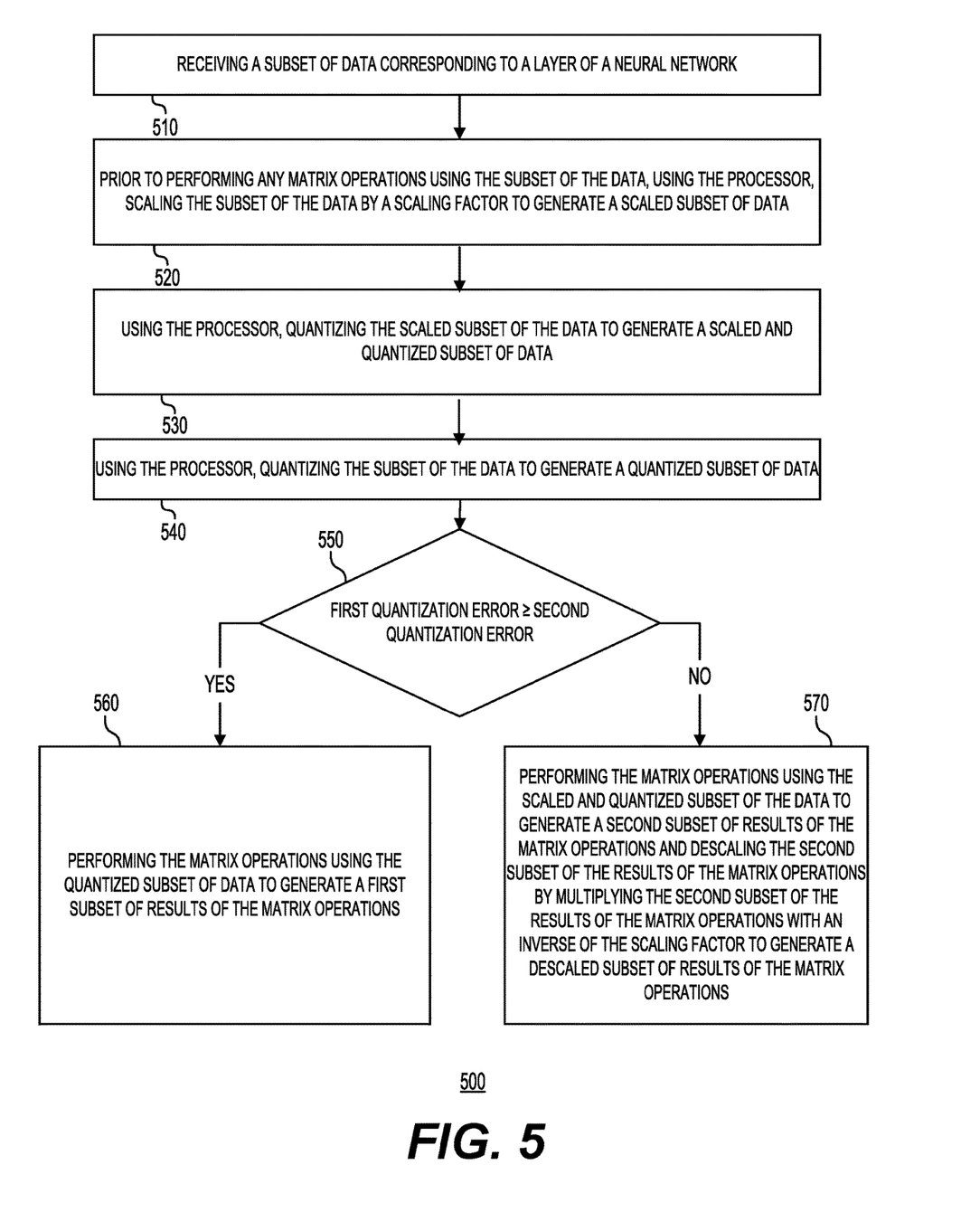
FIG. 5 shows a flow diagram of a method for selectively performing scaled quantization in accordance with one example.

FIG. 5 is a flow chart 500 of a method in accordance with one example. The method may be implemented by processor 310 of FIG. 3. Alternatively, all or some of the steps of this method may be implemented by neural network processor 100. Step 510 may include receiving a subset of data corresponding to a layer of a neural network. In one example, the subset of the data is expressed in a higher precision format (e.g., FP32 of FP16). In one example, the higher precision format may be floating point precision format. Prior to this step, another step may include memory 320 receiving input data 322 via another storage or via a network and storing as part of input data 322.

Step 520 may include, prior to performing any matrix operations using the subset of the data, using the processor, scaling the subset of the data by a scaling factor to generate a scaled subset of the data. This step may be performed using SQ code 328 when executed by processor 310 of FIG. 3. Alternatively, this step may be performed by vector scaling and quantization 192 and/or by matrix scaling and quantization 194.

Step 530 may include, using the processor, quantizing the scaled subset of the data to generate a scaled and quantized subset of data. This step may be performed using SQ code 328 when executed by processor 310 of FIG. 3. Alternatively, this step may be performed by vector scaling and quantization 192 and/or by matrix scaling and quantization 194. In one example, this step may include converting the scaled subset of the data from a higher precision format to a lower precision format.

Step 540 may include using the processor, quantizing the subset of the data to generate a quantized subset of data. This step may be performed using SQ code 328 when executed by processor 310 of FIG. 3. Alternatively, this step may be performed by vector scaling and quantization 192 and/or by matrix scaling and quantization 194. In one example, this step may include converting the subset of the data from a higher precision format to a lower precision format.

Step 550 may include determining a first quantization error associated with the scaled and quantized subset of data and determining a second quantization error associated with the quantized subset of data. In this example, the quantization error may be the L1 error, which is the sum of the absolute differences between the original values and the quantized values. This step may be performed using SQ code 328 when executed by processor 310 of FIG. 3.

Step 560 may include, if the first quantization error is greater than or equal to the second quantization error, performing the matrix operations using the quantized subset of data to generate a first subset of results of the matrix operations. This step may be performed using SQ code 328 when executed by processor 310 of FIG. 3. Alternatively, this step may be performed using neural network processor 100.

Step 570 may include if the first quantization error is lower than the second quantization error, performing the matrix operations using the scaled and quantized subset of the data to generate a second subset of results of the matrix operations and, using the processor, descaling the second subset of the results of the matrix operations, by multiplying the second subset of the results of the matrix operations with an inverse of the scaling factor, to generate a descaled subset of results of the matrix operations. This step may be performed using SQ code 328 when executed by processor 310 of FIG. 3. Alternatively, this step may be performed using neural network processor 100. Although FIG. 5 describes several steps performed in a certain order, additional or fewer steps may be performed in a different order. In addition, each of the steps of flowchart 500 may be performed by neural network processor 100, or by processor 310, or by a combination of the two.

In conclusion, the present disclosure relates to a method including receiving a subset of data corresponding to a layer of a neural network. The method may further include prior to performing any matrix operations using the subset of the data, using a processor, scaling the subset of the data by a scaling factor to generate a scaled subset of data. The method may further include using the processor, quantizing the scaled subset of the data to generate a scaled and quantized subset of data. The method may further include performing the matrix operations using the scaled and quantized subset of the data to generate a subset of results of the matrix operations. The method may further include descaling the subset of the results of the matrix operations, by multiplying the subset of the results of the matrix operations with an inverse of the scaling factor, to generate a descaled subset of results of the matrix operations.

The scaled and the quantized subset of the data may comprise scaled and quantized activation values corresponding to the layer of the neural network. The scaled and the quantized subset of the data may comprise scaled and quantized weight values corresponding to the layer of the neural network.

The subset of the data may be expressed in a first precision format, where the first precision format comprises floating point format. The quantized subset of the data may be expressed in a second precision format, and the second precision format may comprise a precision format selected from one of an integer format, a reduced floating point precision format, or a block floating point format.

The scaled and quantized subset of the data may comprise scaled and quantized matrix data corresponding to weight values for the layer of the neural network, and the performing the matrix operations may comprise performing matrix-vector multiplication operations using the scaled and quantized matrix data and vector data corresponding to activation values for the layer of the neural network. The scaled and quantized subset of the data may comprise scaled and quantized matrix data corresponding to weight values for the layer of the neural network and scaled and quantized vector data corresponding to activation values for the layer of the neural network, and the performing the matrix operations may comprise performing matrix-vector multiplication operations using the scaled and quantized matrix data and the scaled and quantized vector data.

In another example, the present disclosure relates to a processor configured to receive a subset of data corresponding to a layer of a neural network. The processor may further be configured to prior to performing any matrix operations using the subset of the data, scale the subset of the data by a scaling factor to generate a scaled subset of data. The processor may further be configured to quantize the scaled subset of the data to generate a scaled and quantized subset of data. The processor may further be configured to perform the matrix operations using the scaled and quantized subset of the data and generate a subset of results of the matrix operations. The processor may further be configured to descale the subset of the results of the matrix operations, by multiplying the subset of the results of the matrix operations with an inverse of the scaling factor, to generate a descaled subset of results of the matrix operations.

The scaled and the quantized subset of the data may comprise scaled and quantized activation values corresponding to the layer of the neural network. The scaled and the quantized subset of the data may comprise scaled and quantized weight values corresponding to the layer of the neural network.

The subset of the data may be expressed in a first precision format, where the first precision format comprises floating point format. The quantized subset of the data may be expressed in a second precision format, and the second precision format may comprise a precision format selected from one of an integer format, a reduced floating point precision format, or a block floating point format.

The scaled and quantized subset of the data may comprise scaled and quantized matrix data corresponding to weight values for the layer of the neural network, and the processor may further be configured to perform matrix-vector multiplication operations using the scaled and quantized matrix data and vector data corresponding to activation values for the layer of the neural network. The scaled and quantized subset of the data may comprise quantized matrix data corresponding to weight values for the layer of the neural network and scaled and quantized vector data corresponding to activation values for the layer of the neural network, and the processor may further be configured to perform matrix-vector multiplication operations using the scaled and quantized matrix data and the scaled and quantized vector data.

In yet another example, the present disclosure relates to a method including receiving a subset of data corresponding to a layer of a neural network. The method may further include prior to performing any matrix operations using the subset of the data, using a processor, scaling the subset of the data by a scaling factor to generate a scaled subset of data. The method may further include using the processor, quantizing the scaled subset of the data to generate a scaled and quantized subset of data. The method may further include using the processor, quantizing the subset of the data to generate a quantized subset of data. The method may further include determining a first quantization error associated with the scaled and quantized subset of data and determining a second quantization error associated with the quantized subset of data. The method may further include if the first quantization error is greater than or equal to the second quantization error, then performing the matrix operations using the quantized subset of data to generate a first subset of results of the matrix operations. The method may further include if the first quantization error is lower than the second quantization error, then performing the matrix operations using the scaled and quantized subset of the data to generate a second subset of results of the matrix operations and descaling the second subset of the results of the matrix operations, by multiplying the second subset of the results of the matrix operations with an inverse of the scaling factor, to generate a descaled subset of results of the matrix operations.

The scaled and the quantized subset of the data may comprise scaled and quantized activation values corresponding to the layer of the neural network. The scaled and the quantized subset of the data may comprise scaled and quantized weight values corresponding to the layer of the neural network.

The subset of the data may be expressed in a first precision format, where the first precision format comprises floating point format. The quantized subset of the data may be expressed in a second precision format, and the second precision format may comprise a precision format selected from one of an integer format, a reduced floating point precision format, or a block floating point format. The method may further comprise selecting the scaling factor for the subset of the data.

It is to be understood that the methods, modules, and components depicted herein are merely exemplary. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory, such as, DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method comprising:
   receiving a subset of data corresponding to a layer of a neural network;
   prior to performing any matrix operations using the subset of the data, using a processor, scaling the subset of the data by a scaling factor to generate a scaled subset of data;
   using the processor, quantizing the scaled subset of the data to generate a scaled and quantized subset of data, wherein quantizing includes mapping original values of the scaled subset of the data to a quantizing grid having grid points such that largest value from the original values of the scaled subset of the data matches up with highest quantization grid point from among the grid points;
   performing the matrix operations using the scaled and quantized subset of the data to generate a subset of results of the matrix operations; and
   descaling the subset of the results of the matrix operations, by multiplying the subset of the results of the matrix operations with an inverse of the scaling factor, to generate a descaled subset of results of the matrix operations.

2. The method of claim 1, wherein the scaled and the quantized subset of the data comprises scaled and quantized activation values corresponding to the layer of the neural network.

3. The method of claim 1, wherein the scaled and the quantized subset of the data comprises scaled and quantized weight values corresponding to the layer of the neural network.

4. The method of claim 1, wherein the subset of the data is expressed in a first precision format, and wherein the first precision format comprises floating point format.

5. The method of claim 1, wherein the quantized subset of the data is expressed in a second precision format, and wherein the second precision format comprises a precision format selected from one of an integer format, a reduced floating point precision format, or a block floating point format.

6. The method of claim 1, wherein the scaled and quantized subset of the data comprises scaled and quantized matrix data corresponding to weight values for the layer of the neural network, and wherein the performing the matrix operations comprises performing matrix-vector multiplication operations using the scaled and quantized matrix data and vector data corresponding to activation values for the layer of the neural network.

7. The method of claim 1, wherein the scaled and quantized subset of the data comprises scaled and quantized matrix data corresponding to weight values for the layer of the neural network and scaled and quantized vector data corresponding to activation values for the layer of the neural network, and wherein the performing the matrix operations comprises performing matrix-vector multiplication operations using the scaled and quantized matrix data and the scaled and quantized vector data.

8. A processor configured to:
   receive a subset of data corresponding to a layer of a neural network;
   prior to performing any matrix operations using the subset of the data, scale the subset of the data by a scaling factor to generate a scaled subset of data;
   quantize the scaled subset of the data by mapping original values of the scaled subset of the data to a quantizing grid having grid points such that largest value from the original values of the scaled subset of the data matches up with highest quantization grid point from among the grid points to generate a scaled and quantized subset of data;
   perform the matrix operations using the scaled and quantized subset of the data and generate a subset of results of the matrix operations; and
   descale the subset of the results of the matrix operations, by multiplying the subset of the results of the matrix operations with an inverse of the scaling factor, to generate a descaled subset of results of the matrix operations.

9. The processor of claim 8, wherein the scaled and quantized subset of the data comprises scaled and quantized activation values corresponding to the layer of the neural network.

10. The processor of claim 8, wherein the scaled and quantized subset of the data comprises scaled and quantized weight values corresponding to the layer of the neural network.

11. The processor of claim 8, wherein the subset of the data is expressed in a first precision format, and wherein the first precision format comprises floating point format.

12. The processor of claim 8, wherein the scaled and quantized subset of the data is expressed in a second precision format, and wherein the second precision format comprises a precision format selected from one of an integer format, a reduced floating point precision format, or a block floating point format.

13. The processor of claim 8, wherein the scaled and quantized subset of the data comprises scaled and quantized matrix data corresponding to weight values for the layer of the neural network, wherein the processor is further configured to perform matrix-vector multiplication operations using the scaled and quantized matrix data and vector data corresponding to activation values for the layer of the neural network.

14. The processor of claim 8, wherein the scaled and quantized subset of the data comprises quantized matrix data corresponding to weight values for the layer of the neural network and scaled and quantized vector data corresponding to activation values for the layer of the neural network, and wherein the processor is further configured to perform matrix-vector multiplication operations using the scaled and quantized matrix data and the scaled and quantized vector data.

15. A method comprising:
receiving a subset of data corresponding to a layer of a neural network;
prior to performing any matrix operations using the subset of the data, using a processor, scaling the subset of the data by a scaling factor to generate a scaled subset of data;
using the processor, quantizing the scaled subset of the data to generate a scaled and quantized subset of data;
using the processor, quantizing the subset of the data to generate a quantized subset of data;
determining a first quantization error associated with the scaled and quantized subset of data and determining a second quantization error associated with the quantized subset of data;
if the first quantization error is greater than or equal to the second quantization error, then performing the matrix operations using the quantized subset of data to generate a first subset of results of the matrix operations; and
if the first quantization error is lower than the second quantization error, then performing the matrix operations using the scaled and quantized subset of the data to generate a second subset of results of the matrix operations and descaling the second subset of the results of the matrix operations, by multiplying the second subset of the results of the matrix operations with an inverse of the scaling factor, to generate a descaled subset of results of the matrix operations.

16. The method of claim 15, wherein the quantized and scaled subset of the data comprises quantized and scaled activation values corresponding to the layer of the neural network.

17. The method of claim 15, wherein the quantized subset of the data comprises quantized weight values corresponding to the layer of the neural network.

18. The method of claim 15, wherein the subset of the data is expressed in a first precision format, and wherein the first precision format comprises floating point format.

19. The method of claim 15, wherein the quantized subset of the data is expressed in a second precision format, and wherein the second precision format comprises a precision format selected from one of an integer format, a reduced floating point precision format, or a block floating point format.

20. The method of claim 15 further comprising selecting the scaling factor for the subset of the data.

* * * * *